(12) United States Patent
Dawson et al.

(10) Patent No.: US 6,574,641 B1
(45) Date of Patent: Jun. 3, 2003

(54) MANAGEMENT OF PHYSICAL MEDIA VOLUMES IN PARTITIONS OF AN AUTOMATED DATA STORAGE LIBRARY

(75) Inventors: Erika Marianna Dawson, Tucson, AZ (US); James Arthur Fisher, Tucson, AZ (US); Jonathan Wayne Peake, Tucson, AZ (US); Linda Jean Schiltz, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 09/676,414

(22) Filed: Sep. 29, 2000

(51) Int. Cl.[7] ............................................... G06F 17/30
(52) U.S. Cl. ....................... 707/204; 369/30.4
(58) Field of Search ................................ 707/200, 204; 369/30.4

(56) References Cited

U.S. PATENT DOCUMENTS

| | | | |
|---|---|---|---|
| 5,438,674 A | 8/1995 | Keele et al. ................ 395/404 |
| 5,455,926 A | 10/1995 | Keele et al. ................ 395/404 |
| 5,546,557 A | 8/1996 | Allen et al. ................. 395/438 |
| 5,829,053 A | * 10/1998 | Smith et al. ................ 711/202 |
| 5,870,732 A | 2/1999 | Fisher et al. ..................... 707/1 |
| 5,999,982 A | * 12/1999 | Kishi et al. ................ 709/238 |
| 6,014,675 A | 1/2000 | Brewer et al. .............. 707/204 |
| 6,031,798 A | 2/2000 | James et al. ................... 369/34 |
| 6,067,481 A | * 5/2000 | Saliba et al. ................ 700/214 |
| 6,286,079 B1 | * 9/2001 | Basham et al. ............. 711/112 |
| 6,328,766 B1 | * 12/2001 | Long ................................ 710/8 |
| 6,425,059 B1 | * 7/2002 | Basham et al. ............. 711/153 |

OTHER PUBLICATIONS

"Logical Grouping of Data Storage Media in a Library System", IBM Technical Disclosure Bulletin, vol. 35, No. 5, Oct. 1992, pp. 17–20.

* cited by examiner

*Primary Examiner*—Safet Metjahic
*Assistant Examiner*—Haythim Alaubaidi

(57) ABSTRACT

An automated data storage library, method, and a computer program product manage categories of physical media volumes, which may store stacked logical volumes, in partitions of the library. A media sensor senses the VOLSER identifier of thee physical media volumes at an input station. A library manager is provided, having a computer processor. Upon receipt of a physical media volume at the input station, the library manager receives the sensed VOLSER of the physical media volume; places the physical media volume in an "UNASSIGNED" category of an inventory; and sends a message at an interface to a host system, the message identifying the sensed VOLSER and indicating that the physical media volume has transitioned to the "UNASSIGNED" category. The library manager responds to the host system, reassigning the physical media volume to a defined physical volume category comprising (1) an "IMPORT" category as having active logical volumes, and (2) an "INSERT" category as having no active logical volumes; and sends a message to the host system that the volume transitioned to the defined category.

15 Claims, 5 Drawing Sheets

CARTRIDGE TABLE

| VOLSER | CATEGORY | CELLXY | HOMEXY | MOUNTS | MEDIA TYPE | INDICATORS |
|---|---|---|---|---|---|---|
| | | | | | | |

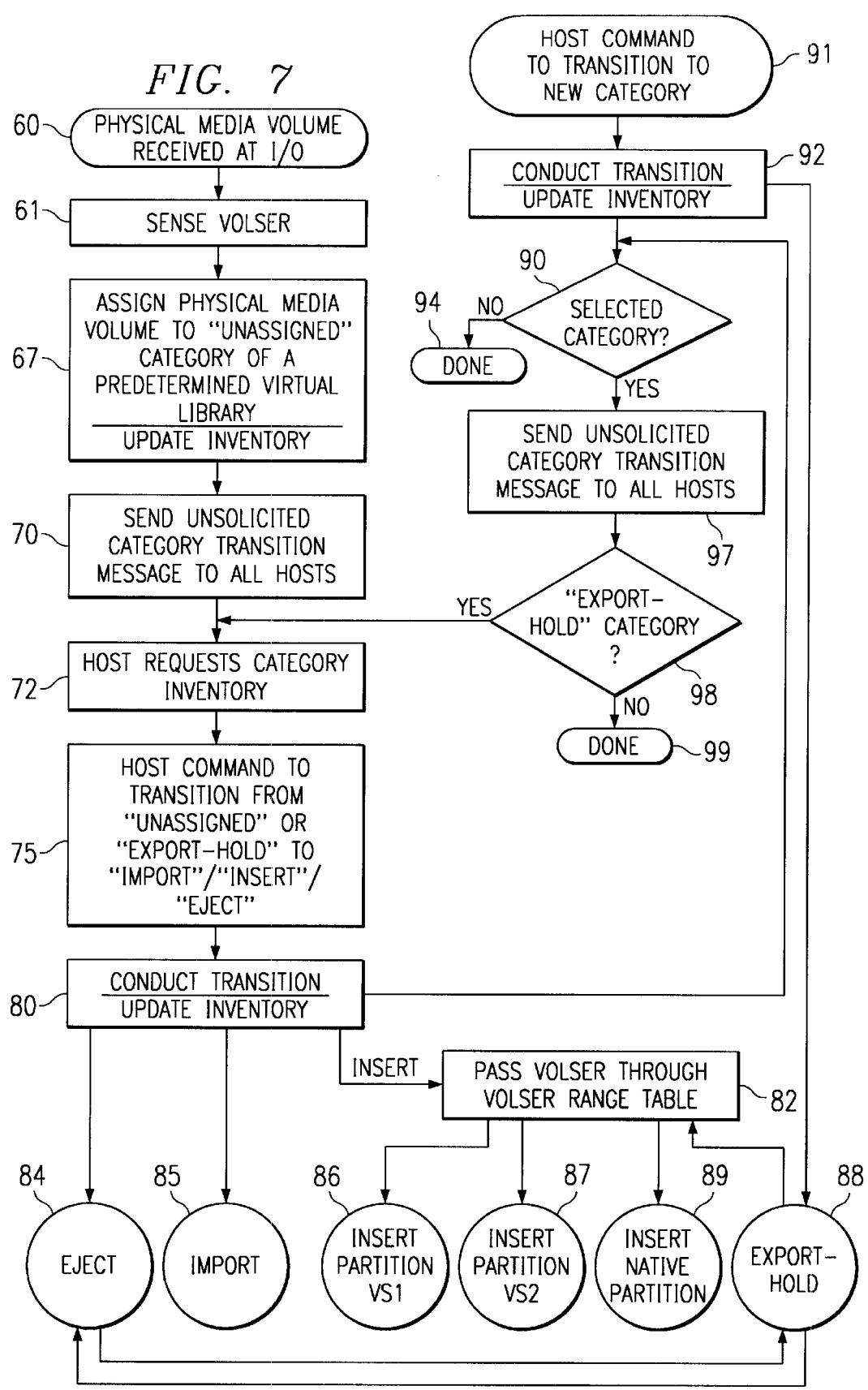

MANAGEMENT OF PHYSICAL MEDIA VOLUMES IN PARTITIONS OF AN AUTOMATED DATA STORAGE LIBRARY

FIELD OF THE INVENTION

This invention relates to the storage of physical media volumes, such as magnetic tape cartridges or optical disk cartridges, in an automated data storage library having a virtual server, and, more particularly, to tracking physical media volumes in, and added to, partitions of the library.

BACKGROUND OF THE INVENTION

Automated data storage libraries store large numbers of physical media volumes of data, such as magnetic tape cartridges or optical disk cartridges, for the use of host data processing systems. In one example, a magnetic tape cartridge automated data storage library stores over 6,000 cartridges. Typically, some of the data stored in the library becomes obsolete or less likely to be requested or updated. As the result, some of the physical media volumes are removed out of the library and are archived. The space made available in the library due to the removed physical media volumes is quickly replaced by "SCRATCH" volumes, which are typically inserted at an I/O station. The SCRATCH volumes are considered to be blank, and data is recorded thereon as desired by the attached host data processing systems. The physical media volumes are typically identified by means of volume serial numbers, or VOLSERs, which may be read by media sensors. As one example, the VOLSER may comprise a label placed on the cartridge which is read by a bar code reader. As another example, the VOLSER may be recorded in an RF chip in the cartridge which is read by an RF receiver.

Many automated data storage libraries are partitioned so as to appear as multiple libraries. They may be called "virtual libraries" or "native libraries" and in the case of tape libraries, each virtual library is controlled by a "Virtual Tape Server", or "VTS", and the media is classified into the various virtual or native partitions by ranges of VOLSERs. The physical media volumes are each capable of storing a plurality of logical volumes. A host may directly manage physical volumes in a "native" library, and manages logical volumes as though they were native library physical volumes. The VTS may comprise part of a library manager, and manages the storage of the logical volumes on the physical media volumes. Thus, when the host manages the logical volumes, it does not directly see or control the virtual library physical media volumes. The partitioned libraries, which may comprise both native and virtual library partitions, typically share an I/O station, and, as SCRATCH volumes are provided at the I/O station, the library manager of the automated data storage library will use a VOLSER range table to assign the physical media volumes to the appropriate partition.

Host systems control the native physical volumes and VTS logical volumes, and typically assign those volumes to specific categories. Examples comprise "SCRATCH", which means that the volume is to be treated as though it is blank; "PRIVATE", which means that the volume has data for a specific partition or host system; or "EJECT"; which means that the volume is being removed from the library.

A newer capability is the export and import of physical media volumes, where particular data, such as logical volumes, is exported on physical media volumes, which may later be imported back into the library. In one example, the physical media volumes containing logical volumes are ejected for the purpose of archiving, and, subsequently, as in disaster recovery, the exported logical volumes are required to rebuild the data of the host systems. Thus, at the time that the logical volumes are imported, the host systems may be aware that the physical media volume is an import volume, and may be aware of the logical volumes stored on a physical media volume, and the partition to which it belongs. Two new categories are provided, "EXPORT", meaning that the data is to be saved for removal from the library; and "IMPORT", which means that the physical media volume may have active data, and is being brought back into the library. However, previously, the host systems had no capability for directly managing the physical media volumes.

Thus, when physical media volumes are provided at an input/output (I/O) station, the library assigns the volumes as UNASSIGNED. An operator, presumably the person who put the volumes in the I/O station, must bring up a program and a display screen to select whether each physical media volume is an IMPORT volume or is an INSERT volume, and assign it to the appropriate category.

This manual operation opens up a point of possible operator error where the operator may incorrectly assign the physical media volume to the wrong category.

Next, the operator may need to decide whether each of the physical media volumes in the IMPORT category is one that is desired by the host system or is one that is not to be an IMPORT volume for one of the present partitions after all, and should be placed in an EJECT category and saved, or changed to an INSERT volume to potentially become a SCRATCH volume.

Again, this manual operation opens up a point of possible operator error where the operator may incorrectly assign the physical media volume to the wrong category.

Once the correct categories have been assigned, the library manager may assign the data to the virtual library and the host may utilize the logical volumes.

Either manual operation error will result in the data of the erroneous SCRATCH volumes being overwritten and destroyed by the host systems. An imported volume is likely to be the only source of the needed data, and the error may lead to the inability to recover from a disaster situation.

SUMMARY OF THE INVENTION

An object of the present invention is to provide accurate management of the categories of physical media volumes in virtual and native library partitions of an automated data storage library.

Disclosed are an automated data storage library, method, and a computer program product, for managing physical media volumes, the physical media volumes each capable of storing a plurality of logical volumes. The automated data storage library is partitioned into a plurality of virtual libraries, and comprises a plurality of storage shelves for storing the physical media volumes; at least one input station for receiving physical media volumes; at least one media sensor for sensing the VOLSER of the physical media volumes; at least one interface coupled to at least one host system; at least one drive unit; at least one accessor for accessing the physical media volumes and transporting the physical media volumes amongst the storage shelves, the input station, and the drive unit; and a library manager coupled to the media sensor the interface, and the accessor.

The library manager comprises at least one computer processor providing an inventory of the physical media volumes identifying media categories, and, upon receipt of a physical media volume at the input station, receives the sensed VOLSER of the physical media volume; places the physical media volume in an "UNASSIGNED" category of the inventory identified for a predetermined one of the virtual libraries; and sends an unsolicited message at the interface to the host system, the message identifying the sensed VOLSER and indicating that the physical media volume has transitioned to the "UNASSIGNED" category.

The library manager additionally responds to an assignment message from the host system; assigning the physical media volume from the "UNASSIGNED" category to a defined category, the defined categories comprising (1) an "IMPORT" category comprising a physical media volume having active logical volumes, and (2) an "INSERT" category comprising a physical media volume which may have no active data; and sends an unsolicited message to the host system, the message indicating that the physical media volume has transitioned to the assigned defined category. The "INSERT" category physical volume is then assigned to a virtual library or a native library partition based on a VOLSER range table.

Additionally, the library manager may identify any change in assignment of the physical media volume to further defined categories, such as "EXPORT-HOLD" and "EJECT" categories, wherein the "EXPORT-HOLD" category comprises a physical volume expected to be transferred from the library as having potentially active logical volumes, and the "EJECT" category comprises a physical media volume which is being transferred from the data storage library. The library manager then sends an unsolicited message to the host system indicating that the physical media volume has transitioned to the further defined category.

For a fuller understanding of the present invention, reference should be made to the following detailed description taken in conjunction with the accompanying drawings.

BRIEF DESCRIPTION OF THE DRAWINGS

FIG. 7 is a flow chart depicting an embodiment of the method of the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
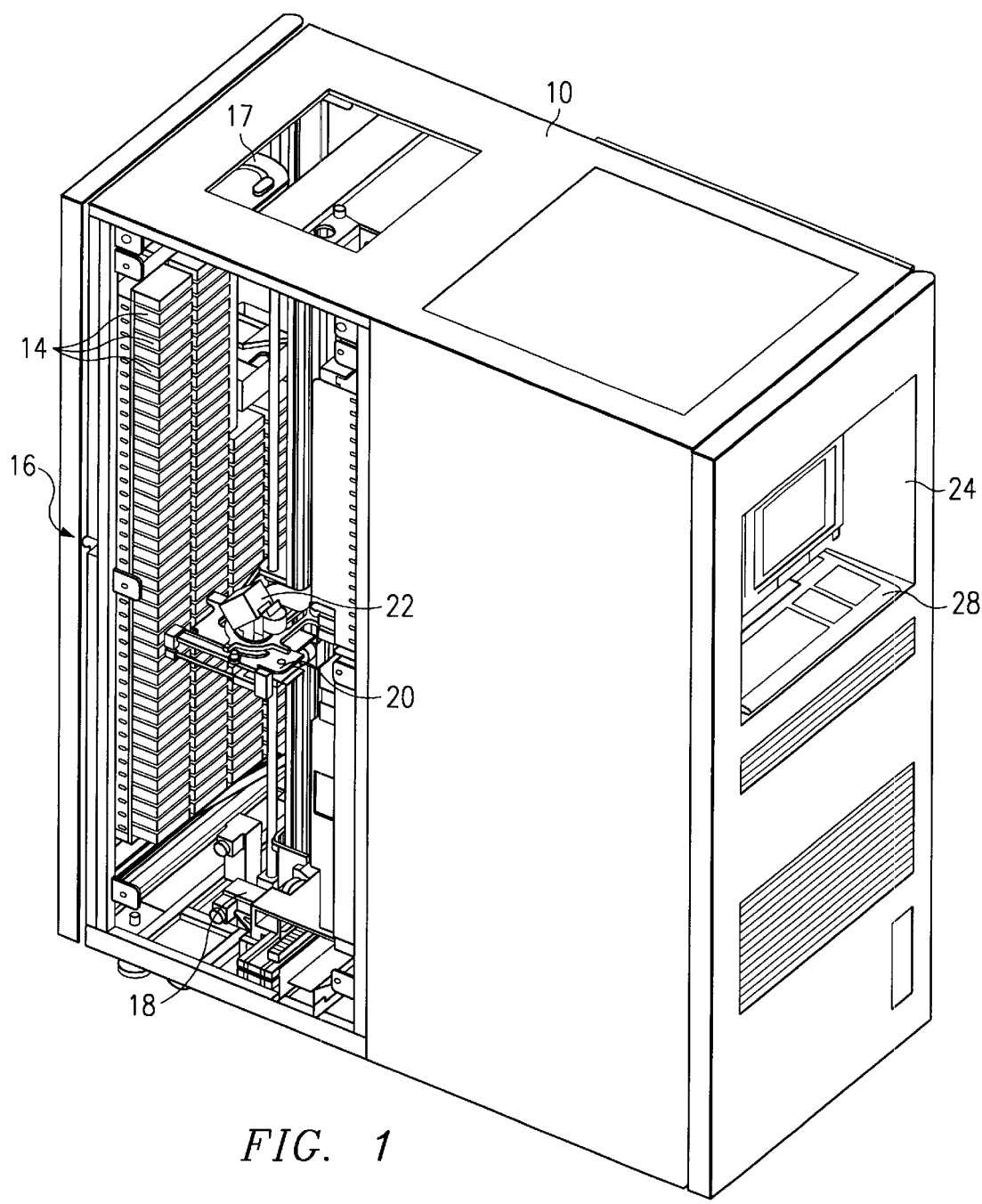
FIGS. 1 and 2 are isometric views of an automated data storage library of the present invention.
Figure 2:
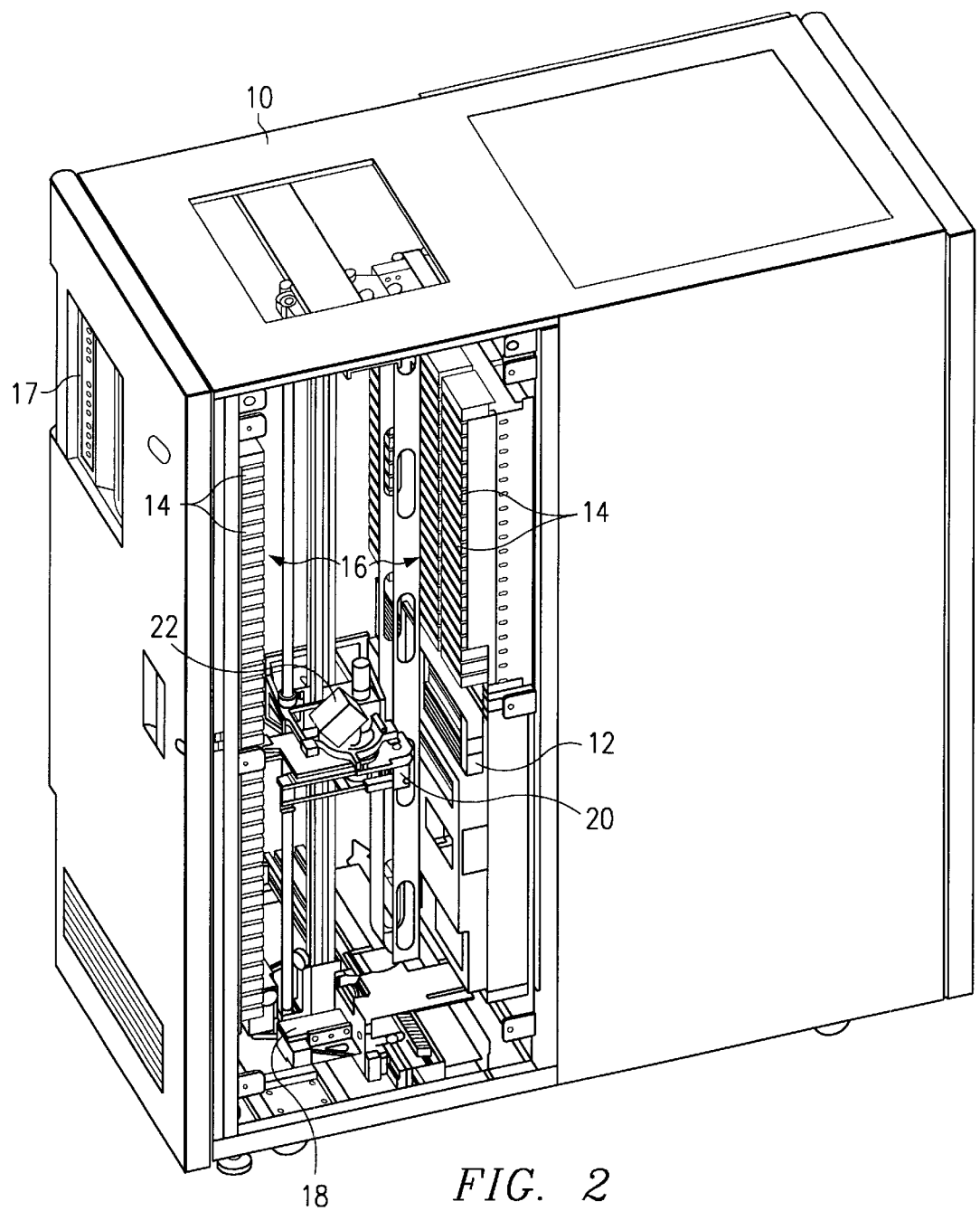
Figure 3:
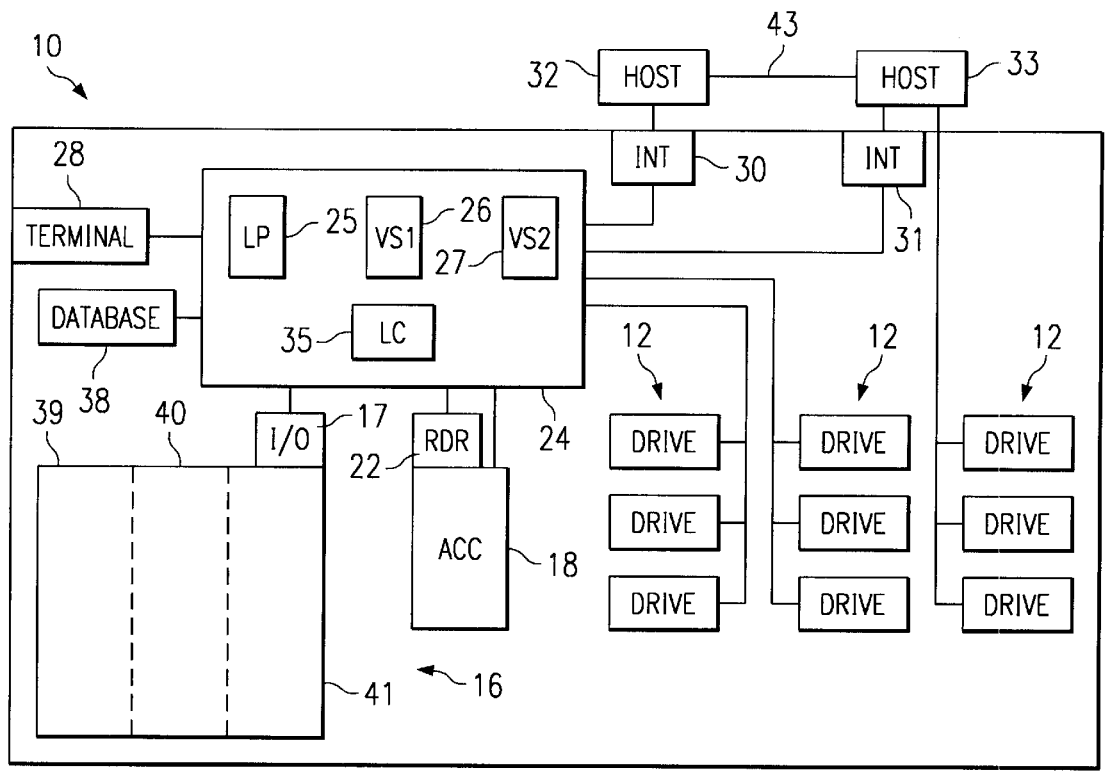
FIG. 3 is a block diagram of an embodiment of the automated data storage library of FIGS. 1 and 2.

Referring to FIGS. 1, 2 and 3, an automated data storage library 10 is illustrated for storing and accessing physical media volumes of data, such as magnetic tape cartridges or optical disk cartridges, for the use of host data processing systems. The library 10 comprises a plurality of data storage drives 12, a plurality of physical media volumes (cartridges) 14 stored in storage shelves 16, one or more input/output stations 17 at which a cartridge may be received or delivered, an accessor 18, and a library manager 24. The accessor 18 transports a selected cartridge 14 amongst a storage shelf 16, an input/output station 17, and/or a data storage drive 12. The accessor includes a cartridge gripper 20 and a media sensor 22. The media sensor 22 may comprise a label reader, such as a bar code scanner, or a reading system, such as a smart card or RF (radio frequency) reader, or other similar type of system, which is able to identify the physical media volume, such as by means of its volume serial number, or VOLSER. As discussed above, in one example, the VOLSER may comprise a label placed on the cartridge which is read by a bar code reader. As another example, the VOLSER may be in recorded in an RF chip in the cartridge which is read by an RF receiver. The data storage drives 12 may, for example, be magnetic tape drives, or optical disk drives, and the cartridges may contain magnetic tape media, optical media, or any other removable media and the associated drives.

The library manager 24, which comprises at least one library computer processor 25, or "LP", may additionally comprise a library controller 35, or "LC", and controls the actions of the accessor 18, the cartridge gripper 20 and the media sensor 22. The library manager is also provided with a terminal 28, which may comprise a processor, keyboard and screen, such as a GUI screen interface. The library manager is also coupled through interfaces 30, 31 to one or more hosts or host systems 32, 33. Data access commands and information to be recorded on, or to be read from, selected cartridges 14 are, in one embodiment transmitted directly between the data storage drives 12 and a host. The library controller is also coupled to the data storage drives to control the load/unload operation. The library manager 24 is provided with a database 38, which includes storage (typically one or more hard disk drives) for tables and programs. An example of a library manager comprises an IBM RS/6000 processor with associated database storage and with an appropriate operating system and application programs, the application programs incorporating the present invention. The computer program product of the present invention may be supplied with an application program, with a diskette or CD-ROM at terminal 28, from one of the host systems, or other similar means.

A single physical automated data storage library may comprise a plurality of "virtual" libraries, in which the storage shelves 16 and the cartridges 14 stored in the storage shelves are used by both in an intermingled fashion. One example of a physical library with a plurality of "virtual" libraries is the IBM 3494 Virtual Tape Server, or "VTS". As an example, the storage shelves 16 are illustrated as divided into two virtual libraries 40 and 41, each assigned to a respective host system 32 and 33. The library manager 24 additionally comprises virtual servers 26, 27 or "VS" which appear to the host systems as libraries to manage the data for the respective host systems. Additionally, the data storage drives 12 may be arranged in groups, and each group assigned to a different one of the VTS's 26 and 27, and to a native library host 33.

The automated data storage library 10 may additionally be partitioned into a "native" library 39 in which a host system 33 directly manages the physical media volumes.

Figure 4:
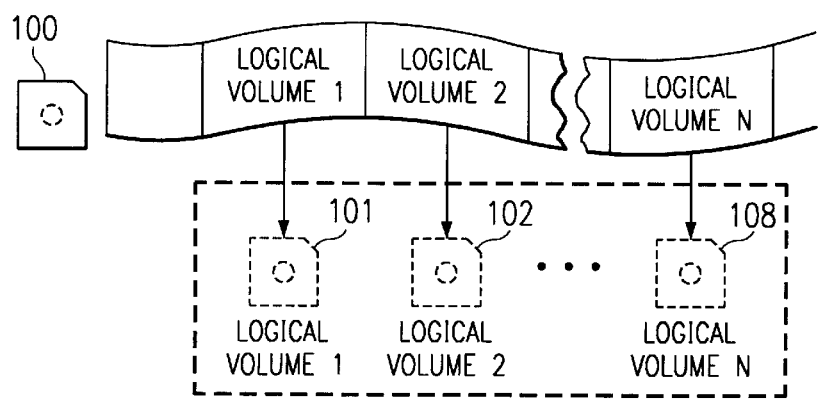
FIG. 4 is a generalized diagram of logical volumes stored on a single physical media volume for use in the library of FIGS. 1–3.

FIG. 4 illustrates a physical media volume 100, such as a magnetic tape in a cartridge, which contains N logical volumes 101 through 108. The storage of multiple logical volumes in a single physical media volume is called "volume stacking". A typical physical media volume comprises a large number of smaller sized logical volumes, which can be of uniform or variable size, and can be individually addressed and accessed. Both the logical volumes and the physical media volumes are identified by VOLSERs.

Figures 5, 6:
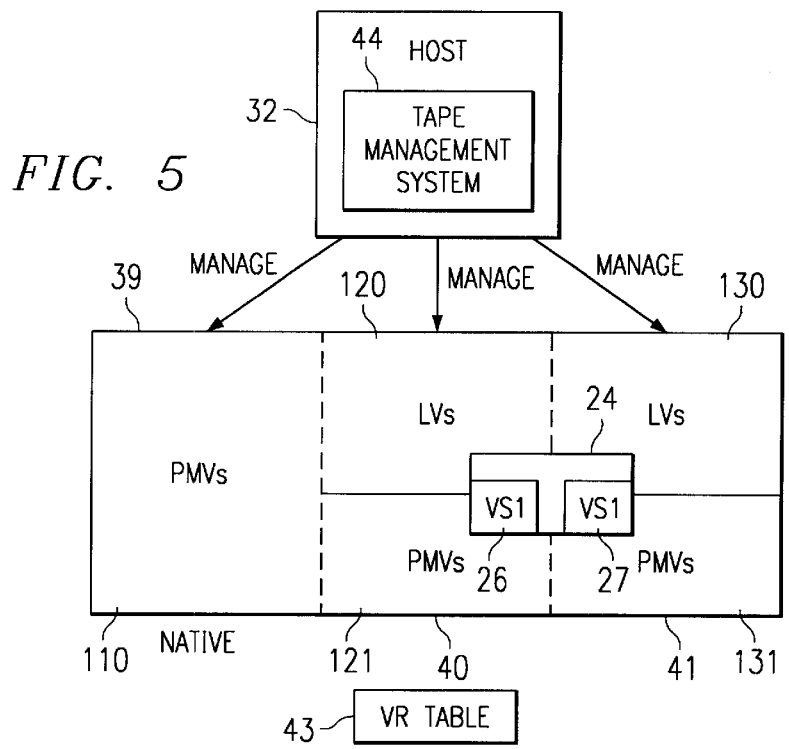
FIG. 5 is a generalized diagram of the library of FIGS. 1–3 illustrating the host management of logical and physical volumes.
FIG. 6 is a diagrammatic illustration of a data storage table (cartridge table) for the automated data storage library of FIGS. 1 and 2.

Referring to FIG. 5, the ability of a host system, e.g., host system 32, to manage the logical volumes and physical volumes is discussed. As in a typical prior art library, a host system directly manages the physical media volumes 110 of the "native" partition, and directly manages theological media volumes 120 of virtual partition 40 or the logical media volumes 130 of virtual partition 41 as though they are physical media volumes of a native library. The virtual server 26, 27 organizes and stores the logical volumes 120, 130 on the physical media volumes 121, 131 for the respective virtual library partitions 40, 41, and retrieves the appropriate physical media volumes when logical volumes are requested by a host system.

The present invention allows the host systems to directly manage physical media volumes 121, 131 under certain circumstances, and the library to constantly notify the host systems of changes between certain categories of the physical media volumes. In so doing, the present invention overcomes the previous isolation of the host systems with respect to the physical media volumes in which the host system did not directly see or control the physical media volumes 121, 131 in the virtual library partitions 40, 41.

FIG. 6 is a diagram of an example of a data storage table (cartridge table) 45 for the automated data storage library of FIGS. 1–3. The cartridge table is stored in database 38 and provides data regarding the status of all the physical media volumes 14 (cartridges) in the library. The cartridge table 45 may also identify the virtual or native library to which the physical media volumes are assigned, which assignment is based on a VOLSER range table, or, in accordance with the invention, is made on a temporary basis. Alternatively, the cartridge table 45 may be organized to separately identify each of the virtual and native libraries. The same, or a different, data storage table may be employed to provide the status of each of the logical volumes. One line of the cartridge table 45 as illustrated represents one volume. The first column 46 in the table, comprises the VOLSER as discussed above.

The second column 47 of the table is the category, or categories, of the volume. As discussed above, a host may assign volumes into logical groups called "categories" having one or more common attributes, which Will be discussed hereinafter.

Other exemplary columns include: "CELLXY" 50, the coordinates of the storage shelf 16 where the cartridge is stored at the present time; "HOMEXY" 51, the coordinates of the "home cell" for this VOLSER; "MOUNTS" 52, the number of times this VOLSER has been mounted on a data storage drive 12; "MEDIA TYPE" 53, the type of physical media volume in a library in which a plurality of types or capacities of cartridges can be stored; and "INDICATORS" 54, which may comprise special identifiers arising during operation of the library.

With reference to the "CATEGORIES" column 47, some known categories of importance to the present invention include: "SCRATCH", which means that the entire physical media volume is to be treated as though it is blank; "INSERT", which means that the physical media volume has no active volumes, and may become an a SCRATCH volume after it is provided to the appropriate partition; "PRIVATE", which means that the physical media volume has active data; or "EJECT", which means that the physical media volume is being removed from the library. Newer categories include: "EXPORT", meaning that the data is to be saved and the cartridge may be removed from the library; and "IMPORT", which means that the physical media volume has active logical volumes, and is being brought back into the library.

Some additional common attributes for which categories may be assigned that are not of importance to the present invention may comprise common expiration dates, common user, host data related to a job or set of jobs.

In each instance, each host provides the category for each cartridge that is assigned to it. However, as discussed above, when the physical media volume (cartridge) is supplied at an input station 17, the library manager 24 does not have access to that information, as there is no information in the cartridge table 45 relating to the VOLSER of that cartridge.

Referring to FIGS. 3, 5 and 6, a function of the library controller 24 in accordance with the present invention is, upon receipt of a physical media volume (cartridge) at the input station 17 and receipt of the sensed VOLSER of the physical media volume, to place the physical media volume in an UNASSIGNED category for a predetermined one of the virtual libraries, and to send a message to all hosts 32, 33, which is unsolicited by a host, the message indicating that a physical media volume has transitioned to the UNASSIGNED category, and identifying the VOLSER of the physical media volume.

The hosts have the information, e.g., in a tape management system 44, whether the physical media volume is an IMPORT volume, an INSERT volume, or one that is not to be an IMPORT volume for one of the present partitions after all, and should be placed in an EJECT category. The library manager 24 responds to an assignment message from the host 32, 33, assigning the physical media volume from the UNASSIGNED category to a defined category, including (1) the IMPORT category, and (2) the INSERT category, or (3) the EJECT category, and sends an unsolicited message to the host system, the message indicating that the physical media volume has transitioned to the assigned defined category. If the physical media volume is assigned to the INSERT category, the library manager employs a VOLSER range table 43 to assign it to one of the partitions.

Thus, in accordance with the present invention, the operation of the library manager 24 alerts the source of the correct information, the hosts, that the physical media volume (cartridge) has been transitioned into the UNASSIGNED category and must be correctly assigned. Additionally, further messages alerting the hosts that specified transitions of the physical media volumes have occurred are sent to all hosts to insure that the hosts are constantly updated on the categories of the physical media volumes in the virtual libraries that indicate the current status of the physical media volumes.

Referring to an embodiment of the computer processor implemented method of the present invention in FIG. 7, and to the automated data storage library of FIG. 3, in step 60, a physical media volume (cartridge) is received at the input station 17. In step 61 the media sensor 22 is operated to sense the VOLSER of the physical media volume. As an example, the library controller 24 may operate the accessor 18 to move the cartridge to an empty storage shelf so the media sensor is able to sense the VOLSER at the label, chip, etc., of the cartridge. As another example, the media sensor 22 may be located at the input/output station 17 and will sense the VOLSER as the cartridge is received at the input/output station. The VOLSER of the received physical media volume is then received from the media sensor 22 by the library manager 24.

The library manager 24 then selects a predetermined one of the virtual library partitions in step 67, and assigns the physical media volume to the UNASSIGNED category and to the predetermined virtual library; for example, in the inventory of the cartridge table 45 of FIG. 6 at the database 38, updating the cartridge table inventory identified for the predetermined virtual library. The selection of the predetermined one of the virtual libraries may be made at initialization of the automated data storage library, or may be made and changed on a continuing basis, as one example, based on the job loads of the virtual libraries, or as another example, on a rotating basis.

Step 67 leads to step 70, at which the library manager 24 sends an unsolicited message at the interface 30, 31 to all of the host systems 32, 33. The unsolicited message identifies the sensed VOLSER and indicates that the physical media volume has transitioned to the UNASSIGNED category. Thus, the operation of the library manager 24 alerts the source of the correct information, the host systems 32, 33, that the physical media volume (cartridge) has been transitioned into the UNASSIGNED category and must be correctly assigned.

It is likely that several physical media volumes may be received at the input/output station 17 at one time, and the library manager 24 will supply several messages indicating the transition of the physical media volumes to the UNASSIGNED category. Hence, as an optional step, one or more of the hosts will query the UNASSIGNED category inventory in step 72. In this manner, the host systems are not required to maintain a list of messages. Optionally, the host systems maintain their own inventory of physical media volumes in the UNASSIGNED category. The host systems 32, 33, e.g., their tape managements systems 44, maintain lists or tables (43 in FIG. 5) of the physical media volumes stored in the library, including their category assignments, since the hosts control the data stored in the library. The hosts also have been made aware at least of any imported physical media volumes, since the imported data will be employed by one of the host systems. As one example, the data on the physical media volume had been placed in an archive and is now required for error recovery. The hosts will also recognize a physical media volume that was thought to be needed and imported, but now is not needed. Thus, in step 75, the host system 32, 33 directly controlling the assignment provides a command to the automated data storage library 10 to transition the physical media volume from the UNASSIGNED category to one of: (1) the IMPORT category, which means that the physical media volume has active logical volumes for import, and is being brought back into the library; (2) the INSERT category, which means that the physical media volume may have no active logical volumes, and may become a SCRATCH volume after it is provided to the appropriate virtual or native library partition, or may have active data and become a PRIVATE volume after it is provided to the appropriate virtual or native library partition; (3) or the EJECT category, which means that the physical data volume is being removed from the library either as not needed or in order to save any data thereon. If the data must be saved, the host system may alternatively transition the physical media volume to the EXPORT-HOLD category and back to EJECT. This action will provide the appropriate information to update any down level host system databases of the status of the physical media volume.

In step 80, the library manager conducts the transition in accordance with the host command, updating the inventory, e.g., of the cartridge table 45 of FIG. 6 at the database 38. If the physical media volume is an INSERT category, the library manager passes the VOLSER of the volume through the VOLSER range table 43 of FIG. 5 in step 82, assigning the volume to one of the partitions. The various categories are illustrated in FIG. 7, the EJECT category labeled 84, the IMPORT category labeled 85, the INSERT category for virtual library partition 1 labeled 86, the INSERT category for virtual library partition 2 labeled 87, the INSERT category for the native library partition labeled 89, and the EXPORT-HOLD category labeled 88.

The VOLSER ranges of the VOLSER range table 43 of FIG. 5 may, for example, comprise VOLSERs "000000"–"999999" for virtual library partition "VS1" and "A00000"–"A99999" for virtual library partition "VS2", providing the basis for the assignment to a partition in step 82. Additionally, step 82 may be employed for a native library physical media volume, for example, comprising VOLSERs "B00000"–B"99999".

Further in accordance with the present invention, in FIG. 7, after the inventory of the cartridge table 45 of FIG. 6 has been updated in step 80, step 90 determines whether the transition of step 80 is to a selected category, which is the further defined category assigned by the one host subsequent to the UNASSIGNED category.

Step 90 is also conducted for any category transition of a physical media volume in the library. Thus, in step 91, a host system 32, 33 may provide a command to transition a physical media volume to another category, as the host works with the data of the physical media volume. In step 92, the library manager 24 responds to the command and conducts the transition. Another command at about the same time may require a move of the cartridge 14 to a different location, e.g., from a data storage drive 12 to a storage shelf 16 or to the input/output port.

As examples, the specific selected categories of step 90 may comprise a transition from INSERT (of any virtual library partition), to SCRATCH, from INSERT or IMPORT to PRIVATE, to EXPORT-HOLD, or to EJECT, or, subsequently, a transition between any of the above categories. Categories that are not selected may comprise categories relating to logical volumes only, or to common expiration dates, common user, or host data related to a job or set of jobs.

If the transition is to a non-selected category, "NO" in step 90, the process is completed, as shown by step 94, and the update to the library inventory of step 92 may have been skipped.

However, if the transition is to a selected category, "YES" in step 90, the library manager 24, in step 97, sends an unsolicited message at the interface 30, 31 to all of the export/import enabled host systems 32, 33. The unsolicited message identifies the VOLSER of the transitioned physical media volume and indicates that the physical media volume has transitioned to the named category. These further messages alert the hosts that specified transitions of the physical media volumes have occurred, and are sent to all hosts to insure that the hosts are constantly updated on the categories of the physical media volumes that indicate the current status of the physical media volumes.

In accordance with the present invention, the EXPORT-HOLD category, like the UNASSIGNED category, is expected to be an interim category. The host system apparently intends to export the physical media volume (cartridge), and will do so by ejecting the cartridge from the library at the input/output station 17 at a time that an operator will receive the cartridge and will place the cartridge in the desired archives for possible future use when needed, such as for error recovery or for disaster recovery.

Hence, in step 98, the library manager 24 determines whether the category transition for which the message was sent in step 97 is a transition to the EXPORT-HOLD category. If not, the process has completed, as illustrated in step 99.

If however, the transition is to the EXPORT-HOLD category, "YES" in step 98, the process sequences to step 72. The host(s) may optionally respond to the message of step 97 and request an inventory of the EXPORT-HOLD category. In step 97, the unsolicited message was sent to all of the hosts, and the host responsible for placing the physical media volume in the EXPORT-HOLD category, will be aware of the expected timing of the need to EJECT. Thus, in step 75, at the time desired by the host system, the host system will provide an "eject" command to cause the library to place the physical media volume in the input/output station 17, and to place the physical media volume VOLSER in the EJECT-category, e.g., in the inventory of the cartridge table 45 of FIG. 6, in step 80.

As discussed above, in accordance with the present invention, in FIG. 7, after the inventory of the cartridge table 45 of FIG. 6 has been updated in step 80, step 90 determines that the transition of step 80 is to a selected category, which, in the present example, is the EJECT category. Thus, the library manager 24, in step 97, sends an unsolicited message at the interface 30, 31 to all of the export/import enabled host systems 32, 33 which identifies the VOLSER of the transitioned physical media volume and indicates that the physical media volume has transitioned to the EJECT category. The physical media volume ay then be removed from the input/output station 17.

Referring to FIGS. 1–3, although only one input/output station 17 has been illustrated, many libraries comprise both a smaller "convenience I/O" and a "high capacity I/O". The present invention is implementable with either type of I/O, or both, as the input/output station 17. Those of skill in the art will understand that the specific functions of the library may be altered in terms of specifics, placement or inter connectivity, such as discussed above.

Referring to FIG. 7, the optional step 72 allows the host to request an inventory of one or more categories. This allows the host to re-sync with the library manager database.

Those of skill in the art will understand that the order of the steps and their specific functions may be altered.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for management of physical media volumes in an automated data storage library, said physical media volumes each capable of storing a plurality of logical volumes, said library partitioned into at least a plurality of virtual libraries, said library having a library manager, said library manager providing an inventory of physical media volumes identifying media categories, a plurality of storage shelves for storing said physical media volumes, at least one input station for receiving physical media volumes, at least one media sensor for sensing VOLSERs of said physical media volumes, said automated data storage library coupled to at least one host system, said method comprising the steps of:

upon receipt of a physical media volume at said input station, operating said media sensor to sense said VOLSER of said physical media volume;

placing said physical media volume in an "UNASSIGNED" category of said inventory identified for a predetermined one of said virtual libraries; and sending an unsolicited message to said at least one host system, said message identifying said sensed VOLSER and indicating that said physical media volume has transitioned to said "UNASSIGNED" category.

2. The method of claim 1, additionally comprising the steps of:

responding to an assignment message from said host system, assigning said physical media volume from said "UNASSIGNED" category to a defined category, said defined categories comprising (1) an "IMPORT" category comprising a physical media volume having active logical volumes, and (2) an "INSERT" category comprising a physical media volume having no active logical volumes;

assigning said "INSERT" category physical media volumes to said virtual libraries based on their sensed VOLSERs; and sending a message to said at least one host system, said message indicating that said physical media volume has transitioned to said assigned defined category.

3. The method of claim 2, additionally comprising the steps of:

identifying any change in assignment of said physical media volume to further defined categories, wherein said further defined categories comprise "EXPORT-HOLD" and "EJECT" categories, wherein said "EXPORT-HOLD" category comprises a physical volume expected to be transferred from said library having potentially active data, and said "EJECT" category comprises a physical media volume which is being transferred from said data storage library; and sending an unsolicited message to said at least one host system, said message indicating that said physical media volume has transitioned to said further defined category.

4. The method of claim 3, additionally comprising the steps of:

said library manager additionally maintaining an inventory of said identified categories of said physical media volumes for each said virtual library; and responding to an inventory request by said at least one host system, supplying said inventory of said identified categories to said at least one host system.

5. The method of claim 1, wherein said message sending step additionally comprises sending said message as an unsolicited "attention" message.

6. An automated data storage library for storing physical media volumes, said physical media volumes each capable of storing a plurality of logical volumes, said library partitioned into at least a plurality of virtual libraries, said library comprising:

a plurality of storage shelves for storing said physical media volumes;

at least one input station for receiving physical media volumes;

at least one media sensor for sensing the VOLSER Of said physical media volumes;

at least one interface coupled to at least one host system;

at least one drive unit;

at least one accessor for accessing said physical media volumes and transporting said physical media volumes amongst said storage shelves, said at least one input station, and said at least one drive unit; and a library manager coupled to said media sensor, said interface, and said accessor, said library manager:
  providing an inventory of said physical media volumes identifying media categories;
  upon receipt of a physical media volume at said input station, receiving said sensed VOLSER of said physical media volume;
  placing said physical media volume in an "UNASSIGNED" category of said inventory identified for a predetermined one of said virtual libraries; and
  sending an unsolicited message at said interface to said at least one host system, said message identifying said sensed VOLSER and indicating that said physical media volume has transitioned to said "UNASSIGNED" category.

7. The automated data storage library of claim 6, wherein said library manager additionally:
  responds to an assignment message from said host system, assigning said physical media volume from said "UNASSIGNED" category to a defined category, said defined categories comprising (1) an "IMPORT" category comprising a physical media volume having active logical volumes, and (2) an "INSERT" category comprising a physical media volume having no active logical volumes;
  assigns said "INSERT" category physical media volumes to said virtual libraries based on their sensed VOLSERs; and
  sends a message to said at least one host system, said message indicating that said physical media volume has transitioned to said assigned defined category.

8. The automated data storage library of claim 7, wherein said library manager additionally:
  identifies any change in assignment of said physical media volume to further defined categories, wherein said further defined categories comprise "EXPORT-HOLD" and "EJECT" categories, wherein said "EXPORT-HOLD" category comprises a physical volume expected to be transferred from said library having potentially active data, and said "EJECT" category comprises a physical media volume which is being transferred from said data storage library; and
  sends an unsolicited message to said at least one host system, said message indicating that said physical media volume has transitioned to said further defined category.

9. The automated data storage library of claim 8, wherein said library manager additionally:
  maintains an inventory of said identified categories of said physical media volumes for each said virtual library; and
  responds to an inventory request by said at least one host system, supplying said inventory of said identified categories to said at least one host system.

10. The automated data storage library of claim 6, wherein said library manager additionally sends said message as an unsolicited "attention" message.

11. A computer program product usable with a programmable computer having computer readable program code embodied therein, for use with an automated data storage library, said library for storing physical media volumes, said physical media volumes each capable of storing a plurality of logical volumes, said library, partitioned into at least a plurality of virtual libraries, said library having a plurality of storage shelves for storing said physical media volumes, at least one input station for receiving physical media volumes, at least one media sensor for sensing the VOLSER of said physical media volumes, and at least one accessor for accessing said physical media volumes and transporting said physical media volumes amongst said storage shelves, said at least one input station, and said at least one drive unit; said library having a library manager coupled to said media sensor, said interface, and said accessor, said library manager having a computer processor providing an inventory of said physical media volumes identifying media categories, said automated data storage library coupled to at least one host system, said computer program product comprising:
  computer readable program code which causes said computer processor to identify media categories;
  computer, readable program code which causes said computer processor, upon receiving said sensed VOLSER of a physical media volume at receipt of said physical media volume at said input station, placing said physical media volume in an "UNASSIGNED" category of said inventory identified for a predetermined one of said virtual libraries; and
  computer readable program code which causes said computer processor to send an unsolicited message at said interface to said at least one host system, said message identifying said sensed VOLSER and indicating that said physical media volume has transitioned to said "UNASSIGNED" category.

12. The computer program product of claim 11, additionally comprising:
  computer readable program code which causes said computer processor to respond to an assignment message from said host system, assigning said physical media volume from said "UNASSIGNED" category to a defined category, said defined categories comprising (1) an "IMPORT" category comprising a physical media volume having active logical volumes, and (2) an "INSERT" category comprising a physical media volume having no active logical volumes;
  computer readable program code which causes said computer processor to assign said "INSERT" category physical media volumes to said virtual libraries based on their sensed VOLSERs; and
  computer readable program code which causes said computer processor to send a message to said at least one host system, said message indicating that said physical media volume has transitioned to said assigned defined category.

13. The computer program product of claim 12, additionally comprising:
  computer readable program code which causes said computer processor to identify any change in assignment of said physical media volume to further defined categories, wherein said further defined categories comprise "EXPORT-HOLD" and "EJECT" categories, wherein said "EXPORT-HOLD" category comprises a physical volume expected to be transferred from said library having potentially active data, and said "EJECT" category comprises a physical media volume which is being transferred from said data storage library; and computer readable program code which causes said computer processor to send an unsolicited message to said at least one host system, said message indicating that said physical media volume has transitioned to said further defined category.

14. The computer program product of claim 13, additionally comprising:

computer readable,program code which causes said computer processor to maintain an inventory of said identified categories of said physical media volumes for each said virtual library; and computer readable program code which causes said computer processor to respond to an inventory request by said at least one host system, supplying said inventory of said identified categories to said at least one host system.

15. The computer program product method of claim 11, wherein said computer readable program code which causes said computer processor to send said message, causes said computer processor to send said message as an unsolicited "attention" message.

* * * * *